United States Patent [19]

Delvaux et al.

[11] Patent Number: 5,053,282
[45] Date of Patent: Oct. 1, 1991

[54] NON-INFLAMMABLE INSULATING COMPOSITE MATERIAL

[75] Inventors: Pierre Delvaux, Bromptonville; Normand Lesmerises, Rock Forest, both of Canada

[73] Assignee: Ceram-Sna Inc., Sherbrooke, Canada

[21] Appl. No.: 409,065

[22] Filed: Sep. 19, 1989

[51] Int. Cl.$^5$ .............................................. E04B 1/74
[52] U.S. Cl. .................................... 428/323; 428/443; 428/703; 252/62; 106/466; 106/DIG. 2; 264/30
[58] Field of Search .................... 106/466, DIG. 2; 252/62; 264/30; 428/443, 703, 323

[56] References Cited

U.S. PATENT DOCUMENTS

| | | | |
|---|---|---|---|
| 3,224,927 | 12/1965 | Brown et al. | 162/155 |
| 3,353,975 | 11/1967 | Shannon | 106/65 |
| 3,367,871 | 2/1968 | Mueller | 106/214 |
| 3,565,650 | 2/1971 | Cordon | 106/97 |
| 3,616,173 | 10/1971 | Green et al. | 428/331 |
| 3,661,603 | 5/1972 | Nicol | 106/90 |
| 3,682,667 | 8/1972 | Roberts et al. | 106/67 |
| 3,718,491 | 2/1973 | Yates | 106/84 |
| 3,809,566 | 5/1974 | Revord | 106/110 |
| 3,933,515 | 1/1976 | Yang | 524/5 |
| 3,954,556 | 5/1976 | Jackson et al. | 162/145 |
| 3,974,024 | 8/1976 | Yano et al. | 162/101 |
| 4,101,335 | 7/1978 | Barrable | 106/99 |
| 4,107,376 | 8/1978 | Ishikawa | 428/305.5 |
| 4,119,591 | 10/1978 | Aldrich | 260/17.2 |
| 4,128,524 | 12/1978 | Barnett et al. | 260/39 R |
| 4,255,197 | 3/1981 | Peralta et al. | 264/59 |
| 4,274,881 | 6/1981 | Langton et al. | 106/98 |
| 4,277,596 | 7/1981 | Lalancette | 528/106 |
| 4,320,022 | 3/1982 | Aitcin | 501/112 |
| 4,363,738 | 12/1982 | Kummermehr | 252/62 |
| 4,414,031 | 11/1983 | Studinka et al. | 106/90 |
| 4,430,157 | 2/1984 | Lalancette | 162/145 |
| 4,461,643 | 7/1984 | Kaufman | 106/36 |
| 4,519,811 | 5/1985 | Lalancette et al. | 51/309 |
| 4,604,140 | 8/1986 | Lalancett et al. | 106/38.9 |
| 4,710,309 | 12/1987 | Miller | 252/62 |
| 4,722,866 | 2/1988 | Wilson et al. | 428/426 |
| 4,985,164 | 1/1991 | Delvaux et al. | 252/62 |

FOREIGN PATENT DOCUMENTS

| | | |
|---|---|---|
| 1235149 | 4/1988 | Canada . |
| 49-074280 | 7/1974 | Japan . |
| 1172907 | 8/1985 | U.S.S.R. . |
| 1083809 | 9/1967 | United Kingdom . |

Primary Examiner—George F. Lesmes
Assistant Examiner—Beverly A. Pawlikowski
Attorney, Agent, or Firm—Foley & Lardner

[57] ABSTRACT

Disclosed is a non-inflammable insulating, composite material capable of being shooted onto a surface to be coated, such as the wall of a building to be insulated. This material comprises a fibrous-like, synthetic forsterite obtained by calcination of chrysolite asbestos fibers at a temperature from 650° to 1450° C.; an inorganic, lightweight filler selected amongst vermiculite, perlite and their mixtures; and a non-inflammable, hydraulic or silicate binder contained in such an amount as to make the material sufficiently adhesive to be shooted as a coating, either as such or after wetting, onto the surface to be insulated. The weight ratio of the synthetic forsterite to the inorganic filler is ranging from 20:80 to 80:20 to adjust the volumic weight of the final product from about 0.20 to about 0.50 gram per cm3. Also disclosed are methods of manufacturing such a non inflammable, insulating, composite material in a wet, ready-to-be-shooted form.

9 Claims, No Drawings

5,053,282

NON-INFLAMMABLE INSULATING COMPOSITE MATERIAL

BACKGROUND OF THE INVENTION a) Field of the Invention

The present invention relates to a non-inflammable, insulating composite material adapted to be shooted as a coating, either as such or after wetting, onto a surface to be insulated, such as the wall of a building.

The invention also relates to methods of preparing such a non-inflammable, insulating composite material in a wet, ready-to-be-shooted form, and to the coated surface obtained after shooting of the so prepared material.

b) Brief Description of the Prior Art

U.S. patent application Ser. No. 246,198, now U.S. Pat. No. 4,985,164 filed on Nov. 8, 1988 in the name of the same Applicant discloses and claims a fibrous-like synthetic forsterite product which is particularly useful as an insulating material. This product which is presently offered for sale under the trademark, FRITMAG and will be called under as such hereinafter, is obtained by subjecting chrysotile asbestos fibers of any commercial grade, having an MgO:SiO2 ratio lower than 1:1, to calcination at a temperature of from 650° to 1450° C.

FRITMAG has a raw loose density of from 3 to 40 pounds per cubic foot, a thermal conductivity K factor of from 0.25 to 0.40 BTU. in/hr.°F.ft2 and a fusion point of about 1600° to 1700° C. It possesses a somewhat fibrous structure ressembling that of the, chrysotile asbestos fibers from which it derives, although this fibrous structure has shown to disappear upon rough manipulation, when subjected to pressure, or when mixed with other material. Then, the fibrous structure is lost but the product has and always retains a high insulating value which is quite superior to granular forsterite and similar to KAOWOOL (trademark) or rockwool.

In the above mentioned U.S. patent application, it is mentioned that FRITMAG may be used as a substitute for asbestos, whenever a fibrous material to be used in bulk and having high insulating qualities is needed. Indeed, FRITMAG is fibrous and has a loose density range substantially identical to asbestos. It also has high insulating properties and is devoided of all the undesirable health problems allegedly attributed to asbestos.

In the above mentioned U.S. patent application, it is also suggested to mix FRITMAG with an inert filler and a binder in order to form an insulating composition adapted to be shooted onto any surface to be insulated or to be moulded in the form of slabs for roof insulation. However, no specific example of such a composition is given, except for a short reference made in the specification to a possible mixing with other materials, such as Portland cement. Similarly, no method of manufacturing slabs from such a composition is disclosed, although it is obvious that some of the methods presently used on an industrial scale to manufacture slabs may not be applicable if FRITMAG is part of the combination, because of the change of structure that has been noticed in this product when it is subjected to pressure or mixed with other material.

SUMMARY OF THE INVENTION

The present invention derives from further studies that have been conducted on FRITMAG since it was first synthetized.

The present invention provides a new, non inflammable, insulating composite material comprising:

a fibrous-like, synthetic forsterite as defined hereinabove, namely FRITMAG;

an inorganic, lightweight filler selected amongst vermiculite, perlite and their mixtures; and a non inflammable binder present in such an amount as to make the material sufficiently adhesive to be shooted as a coating, either as such or after wetting, on a surface to be insulated, wherein the weight ratio of FRITMAG to the inorganic filler is ranging from 20:80 to 80:20.

Insulating, composite materials and/or composition specially adapted to be shooted or spreaded either in dry form or in wet form onto a surface in order to insulate the same are well known in the art and commonly used for the insulation of buildings. By way of reference, an example of such a known composition is disclosed in U.S. Pat. No. 4,710,309 granted to American Sprayed-On Fibers Inc.

The composite material according to this present invention distinguishes over the prior art in that it is exclusively made of non organic elements. Accordingly, it is really non inflammable and it does not generate smoke in case of fire. Moreover, the composite material according to the invention is adapted to be shooted in a wet form, thereby avoiding the generation of dust during shooting.

The composition mainly comprises vermiculite and/or perlite in admixture with FRITMAG, in a weight ratio of FRITMAG to vermiculite and/or perlite ranging from 20:80 to 80:20. When the ratio FRITMAG to vermiculite is equal to 80:20, the resulting material after shooting has a volumic weight of about 0.50 g/cm3. When the ratio FRITMAG to vermiculite is equal to 20:80, the composite material after shooting has a volumic weight of about 0.20 g/cm3. Accordingly, the volumic weight of final product is ranging from about 0.20 to about 0.50 g/cm3 which is very low, thereby making the composite material according to the invention very efficient as a light weight fibrous insulation and fibrous material.

In accordance with a first embodiment of the invention particularly useful when the surface on which the material is shooted must resist to high temperature, the non-inflammable binder is preferably the silicate-based binder. As such a silicate-based binder, use can be made of sodium or potassium silicate.

In accordance with another embodiment of the invention especially adapted for fire-proofing a building, the non inflammable binder is a hydraulic binder such as Portland cement or plaster.

In both cases, inorganic, reinforcing fibers may be added to the material in such an amount as to improve the cohesion strength thereof. Advantageously, use is made from 1 to 5% by weight of inorganic, reinforcing fibers based on the total weight of the material. Preferably, these fibers are selected amongst glass fibers, ceramic fibers and rock wool.

The present invention also proposes a method of preparing a non-inflammable, insulating composite material in a wet, ready-to-be-shooted form, comprising the steps of:

introducing into a concrete mixer an inorganic, light weight filler selected amongst vermiculite, perlite and their mixtures;

introducing into said mixer a non-inflammable hydraulic binder such as Portland cement, and FRITMAG; the amount of FRITMAG introduced to the mixture being so selected that the weight ratio of FRITMAG to the inorganic filler is ranging from 20:80 to 80:20; the amount of binder introduced into the mixture being so selected as to make the resulting material sufficiently adhesive after wetting to be shooted onto a surface to be coated;

introducing water into the mixer; and operating the mixer for 10 to 15 minutes;

whereby the resulting composite material is ready-to-be-shooted as such onto the surface to be coated.

If desired, from 1 to 5% by weight of inorganic fibers, based on the total weight of solids already introduced into the mixer, may be progressively added into this mixer while it is operating.

The invention further provides another method of preparing a non-inflammable insulating, composite material in a wet, ready-to-be-shooted form, comprising the steps of:

introducing into a concrete mixer an inorganic lightweight filler selected amongst the vermiculite, perlite and their mixture;

introducing into said mixer a non inflammable, silicate binder diluted with water, the amount of binder introduced into the mixer being so selected as to make the resulting material sufficiently adhesive after wetting to be shooted onto a surface to be coated;

introducing FRITMAG into the operating mixer, the amount of FRITMAG introduced into the mixture being so selected at the weight ratio of the synthethized forsterite to said inorganic filler is ranging from 20:80 to 80:20 and operating the mixer for 10 to 15 minutes, whereby the composite material is ready to-be-shooted as such onto the surface to be insulated.

Once again, inorganic, reinforcing fibers may be added into the mixture, such an addition being preferably carried out progressively to avoid the formation of aggregates after introduction of FRITMAG into the mixer.

The non inflammable, insulating composite material according to the invention has the following advantages:

1) as any composite material capable being shooted or spreaded onto the surface to be insulated, its installation is very easy to carry out, as compared to conventional insulating material such as fiberglass or mineral wool;

2) when use is made of a silicate binder, drying of the material can be carried out at a temperature ranging from ambient to 750° C.;

3) when use is made of a silicate binder, the resulting material has a melting temperature of about 1450° C., and 4) the thermoconductivity K factor of the material is of about 0.70 BTU.in/hr. °F.fT²;

5) after heating at 750° C., the surface of the material becomes very hard and resistant to erosion and thermal shock;

6) it is not subject to degradation in the case of contact with water; and 7) when use is made of a silicate binder, the material can be used either as a fire proofing material for building, or as an industrial, insulating 8) When use is made of a hydraulic binder, the resulting material must necessarily be dried at ambient temperature and cannot be used over 1000° C. for a long period of time. The composition containing a hydraulic binder however is less expensive than the other one, although it is as insulating as this other one.

Non restrictive examples will now be given to better understand the invention.

EXAMPLE 1

Table 1 hereinafter gives the composition of four different composite materials according to the invention, containing a silicate binder. Each composite material was prepared according to the method disclosed hereinabove, and was shooted onto 30 cm × 30 cm stainless steel plates, using a spraying machine of trademark ARFA.

The plates coated with the composite materials were dried at ambient for 24 hours and subsequently placed into an autoclave 24 hours at 105° C.

TABLE I

| COMPONENTS | COMPOSITION | | | |
|---|---|---|---|---|
| | #1 | #2 | #3 | #4 |
| FRITMAG (kg) | 15.6 | 11.7 | 7.8 | 3.9 |
| Vermiculite No. 3 (kg) | 3.9 | 7.8 | 11.7 | 15.6 |
| Glass fibers* (kg) | 0.6 | 0.6 | 0.6 | 0.6 |
| Sodium silicate N (liters) | 4.2 | 4.2 | 4.2 | 4.2 |
| Water (liters) | 37.8 | 37.8 | 37.8 | 37.8 |
| Weight ratio $\frac{FRITMAG}{vermiculite}$ | 80/20 | 60/40 | 40/60 | 20/80 |
| volumic weight (gr/cm3) | 0.51 | 0.45 | 0.43 | 0.28 |
| K $\frac{BTU \cdot in}{hr \cdot °F. \cdot ft^2}$ | 0.73 | 0.71 | 0.70 | 0.55 |

*FIBERGLASS R Canada 6 mmm 303 wet.

As can be noted, the volumic weights ranged from 0.51 to 0.28 g/cm3 while the thermal conductivity factor K ranged from 0.73 to 0.55 for a weight ratio of FRITMAG to vermiculite ranging from 80:20 to 20:80.

EXAMPLE 2

Composition No. 2 of example 1 was shooted onto 30 cm × 30 cm stainless steel plates. The thicknesses of the layer of material that was shooted onto the plates, were equal to 0.50; 0.75; 1.00; 2.00 and 3.00 inches, respectively. The plates were dried at ambient temperature for 24 hours and placed into an autoclave for 24 hours at 105° C.

These plates were tested by the Applicant as follows: a 8"×8" opening was made in the horizontal top wall of an oven designed to reach temperature as high as 1000° C. A stainless steel mesh was placed over the opening, to act as a support for the coated plates to be tested. A heating element was placed into the oven, just under the coated plates. A thermocouple was placed onto the lower surface of the test plates to measure their temperature. Three other thermocouples were placed onto the upper surface of the tested plates to measure the temperature of the cold side of these plates at different location over a period of 150 minutes. The results obtained with this testing method which permits to compare the thermal insulation resistance of the tested plates as a function of time are given in table II hereinafter.

By way of comparison, tests were carried out at the same condition with an available commercial, insulating material of trademark MONOKOTE.

TABLE II

VARIATION OF TEMPERATURE (°C.) ON THE COLD SIDE THE PLATE AS A FUNCITON OF TIME
(the other side of the plate being heated at 1000° C.)

| | Composition No. 2 Thickness (inch) | | | | | MONOKOTE R | |
|---|---|---|---|---|---|---|---|
| Time (inch) | .50 | .75 | 1.00 | 2.00 | 3.00 | 0.90 | 1.46 |
| 5 | 109 | 46 | 45 | 44 | 42 | 40 | 35 |
| 15 | 225 | 145 | 98 | 58 | 52 | 87 | 51 |
| 30 | 225 | 183 | 140 | 97 | 65 | 145 | 104 |
| 45 | 235 | 197 | 150 | 117 | 73 | 158 | 162 |
| 60 | 241 | 207 | 163 | 124 | 83 | 162 | 186 |
| 75 | 253 | 210 | 169 | 132 | 90 | 163 | 196 |
| 90 | 248 | 212 | 171 | 136 | 95 | 169 | 178 |
| 105 | 268 | 218 | 176 | 138 | 101 | 165 | 168 |
| 120 | 266 | 218 | 174 | 140 | 105 | 166 | 161 |
| 135 | 268 | 221 | 176 | 140 | 107 | 166 | 161 |
| 150 | 263 | 222 | 176 | 143 | 109 | 168 | 159 |

As can be noted, the insulating capacity of the insulating, composite material according to the invention is substantially identical to the one sold under the trademark MONOKOTE. However, contrary to the MONOKOTE material which deshydrated after only one cycle of heating the insulating composite material according to the invention shown no visible sign of desaggregation and no variation of temperature on its cold side after 15 cycles of heating.

EXAMPLE 3

The composition of example 1 was shooted as disclosed hereinabove onto the internal wall of the combustion chamber of a standard, maple syrup evaporator. The thickness of the coating that was shooted was 1.5". The evaporator was 18" wide×9' long. A gas burner was used and the combustion chamber was heated at a temperature of 750° C.

After application of the composite material according to the invention, the burner was switched on and the temperature was measured directly against the combustion chamber on the external lateral surface of the evaporator. The results that were so obtained are shown in Table III hereinafter.

TABLE III

EVOLUTION OF THE TEMPERATURE (°C.) OF THE EXTERNAL, COLD SURFACE OF A GAS-HEATED EVAPORATOR AS A FUNCTION OF TIME
(INTERNAL TEMPERATURE OF EVAPORATOR: 750° C.)

| Time (minute) | initial drying C.° | first operation cycle C.° | fifth operation cycle C.° | Ceramic fibers first operation cycle C.° |
|---|---|---|---|---|
| | Composition No. 3 | | | |
| 5 | 23 | 22 | — | 29 |
| 15 | 28 | 34 | 22 | 34 |
| 30 | 49 | 67 | 55 | 66 |
| 45 | 66 | 91 | 85 | 90 |
| 60 | 78 | 104 | 101 | 102 |
| | Composition No. 2 | | | |
| 75 | 84 | 111 | 109 | 106 |
| 90 | 86 | 115 | 114 | 110 |
| 105 | 86 | 118 | 117 | 108 |
| 120 | 87 | 122 | 119 | 109 |
| 135 | 87 | 122 | 119 | 112 |
| 180 | 87 | 124 | 121 | 110 |
| 240 | 88 | 123 | 122 | 111 |
| 255 | 92 | 125 | 121 | 112 |
| 270 | 105 | 124 | 122 | 111 |

TABLE III-continued

EVOLUTION OF THE TEMPERATURE (°C.) OF THE EXTERNAL, COLD SURFACE OF A GAS-HEATED EVAPORATOR AS A FUNCTION OF TIME
(INTERNAL TEMPERATURE OF EVAPORATOR: 750° C.)

| Time (minute) | initial drying C.° | first operation cycle C.° | fifth operation cycle C.° | Ceramic fibers first operation cycle C.° |
|---|---|---|---|---|
| 480 | — | 125 | 123 | 113 |

After shooting, the temperature stay at about 80° to 90° C. for 220 minutes, during the initial drying. Thereafter, subsequent cycles of operation were carried out, each for a period of 8 hours. The reported tests show that the external temperature remained the same from the first to the fifth cycles of operation. After five operations of 8 hours, the shooted material showed no sign of desaggregation.

By way of comparison, the same test was carried out on the same kind of evaporator provided with a 1" layer of ceramic fibers insulation, and with a 1" thick mineral wool insulation. After one cycle of operation, this insulating coating showed sign of desaggregation at the flame-leached surfaces of the evaporator.

EXAMPLE 4

The composition No. 5 given in Table IV hereinafter was shooted onto 30 cm×30 cm stainless steel plates, using the method disclosed hereinabove. The composition that contain a hydraulic binder, namely Portland cement of type 10, was shooted to form 0.80, 1.22; 1.73 inches thick coatings, respectively. The plates were kept at ambient temperature for a period of 3 weeks and dried it in an autoclave for 24 hours at 105° C. The volumic weight of the final product was 0.40 g/cm3. Heating tests were carried out and the results of these tests are reported in Table V, hereinafter.

TABLE IV

| Composition No. 5 | |
|---|---|
| FRITMAG | 5 kg |
| Vermiculite No. 3 | 15 kg |
| Glass fiber | 1 kg |
| Portland cement (type 10) | 10 kg |
| Water | 85 liters |

TABLE V

EVOLUTION OF THE TEMPERATURE (°c.) OF THE COLD SIDE OF THE TESTED PLATES AS A FUNCTION OF TIME (HOT SIDE AT 1,000° C.)

| | Composition No. 5 Thickness inch | | |
|---|---|---|---|
| Time (min) | 0.8 0° C. | 1.22 0° C. | 1.73 0° C. |
| 5 | 91 | 92 | 39 |
| 15 | 161 | 109 | 75 |
| 30 | 178 | 153 | 119 |
| 45 | 191 | 163 | 138 |
| 60 | 194 | 167 | 144 |
| 75 | 188 | 169 | 148 |
| 90 | 195 | 168 | 151 |
| 105 | 202 | 168 | 149 |
| 120 | 191 | 168 | 149 |
| 135 | 195 | 167 | 149 |
| 150 | 195 | 168 | 152 |
| 165 | 195 | 167 | 151 |

As will be noted, the insulating capacity of composition No. 5 according to the invention is substantially identical to the one of example II. However, when thermal stress tests were carried out, signs of desaggregation appeared on the insulating material of composition No. 5 after 5 to 6 cycles.

What is claimed is:

1. A non-inflammable insulating, composite material comprising:
   a fibrous-like, synthetic forsterite obtained by calcination of chrysotile asbestos fibers at a temperature of from 650° C. to 1450° C., said synthetic forsterite having an $MgO:SiO_2$ ratio lower than 1.1, a raw loose density of from 3 to 40 pcf, a thermal conductivity "k" factor of from 0.25 to 0.40 BTU. in/hr. $°F.ft^2$ and a fusion point of from 1600° to 1700° C.;
   an inorganic, lightweight filler selected from the group consisting of vermiculite, perlite and their mixtures; and
   a non-inflammable binder present in such an amount as to make the material of sufficiently adhesive, after wetting to be shooted as a coating onto a surface to be insulated,
   wherein the weight ratio of said synthetic forsterite to said inorganic filler is ranging from 20:80 to 80:20.

2. The composite material of claim 1, wherein said non-inflammable binder is a hydraulic binder.

3. The composite material of claim 2, wherein the hydraulic binder is Portland cement.

4. The composite material of claim 1, wherein said non-inflammable binder is a silicate binder.

5. The composite material of claim 1, further comprising:
   inorganic, reinforcing fibers in such an amount as to improve the cohesion strength of said material.

6. The composite material of claim 1, further comprising from 1 to 5% by weight of inorganic, reinforcing fibers based on the total weight of the material and wherein said inorganic fibers are selected from the group consisting of glass fibers, ceramic fibers and rockwool.

7. The composite material of claim 2, further comprising from 1 to 5% by weight of inorganic, reinforcing fibers based on the total weight of the material and wherein said inorganic fibers are selected from the group consisting of glass fibers, ceramic fiber and rockwool.

8. The further composite material of claim 3, comprising from 1 to 5% by weight of inorganic, reinforcing fibers based on the total weight of the material and wherein said inorganic fibers are selected from the group consisting of glass fibers, ceramic fiber and rockwool.

9. The further composite material of claim 4, comprising from 1 to 5% by weight of inorganic, reinforcing fibers based on the total weight of the material and wherein said inorganic fibers are selected from the group consisting of glass fibers, ceramic fibers and rockwool.

* * * * *